United States Patent [19]

Chen et al.

[11] Patent Number: 5,366,246
[45] Date of Patent: Nov. 22, 1994

[54] VEHICLE FUEL TANK MOUNTING AND PROTECTIVE CAGE

[75] Inventors: David E. Chen; Brad A. Hively; Patrick G. Gerardot, all of Fort Wayne, Ind.

[73] Assignee: Navistar International Transportation Corp., Chicago, Ill.

[21] Appl. No.: 60,457

[22] Filed: May 11, 1993

[51] Int. Cl.5 .............................................. B60K 15/07
[52] U.S. Cl. .................................. 280/834; 220/562; 224/42.43; 248/313; 248/503
[58] Field of Search .............. 280/834, 830; 220/562; 224/42.43, 42.45; 248/313, 503

[56] References Cited

U.S. PATENT DOCUMENTS

| | | | |
|---|---|---|---|
| 1,354,829 | 10/1920 | Hubka | 224/42.43 |
| 2,758,845 | 8/1956 | Doyle et al. | 280/834 |
| 4,013,300 | 3/1977 | Berger | 280/834 |
| 4,357,027 | 11/1982 | Zeitlow | 280/834 |

Primary Examiner—Mitchell J. Hill
Attorney, Agent, or Firm—Dennis K. Sullivan

[57] ABSTRACT

A protective cage and mounting device for a fuel tank of a vehicle such as school bus wherein the fuel tank is secured directly to the protection cage, the cage being secured to a vehicle frame rail. The protective cage includes a front section, rear section, side section, and a truss-like bottom shelf section, each of these sections being weldments constructed of low carbon, high strength steel tubing having rectangular cross-sections. The sections are welded to each other to produce stiff joints between said sections with the result that there is less parallelogramming and localized deformation of the protection cage in the event of an accident. Hold down devices are carried by the bottom shelf section for securing the fuel tank thereto.

23 Claims, 2 Drawing Sheets

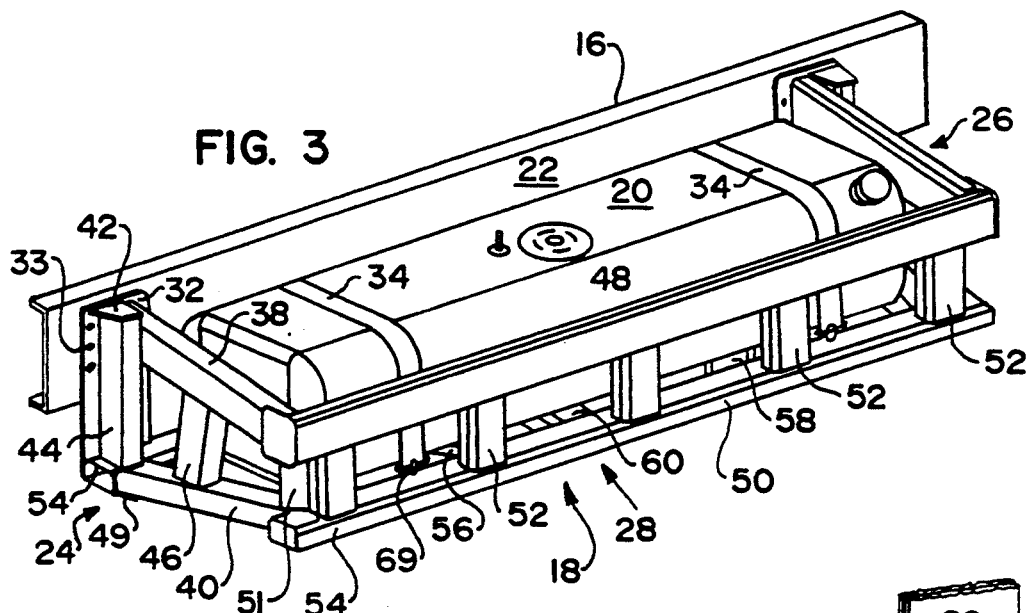
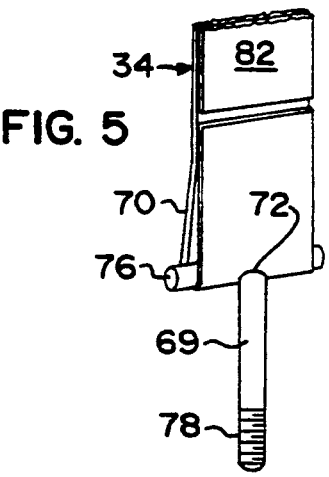
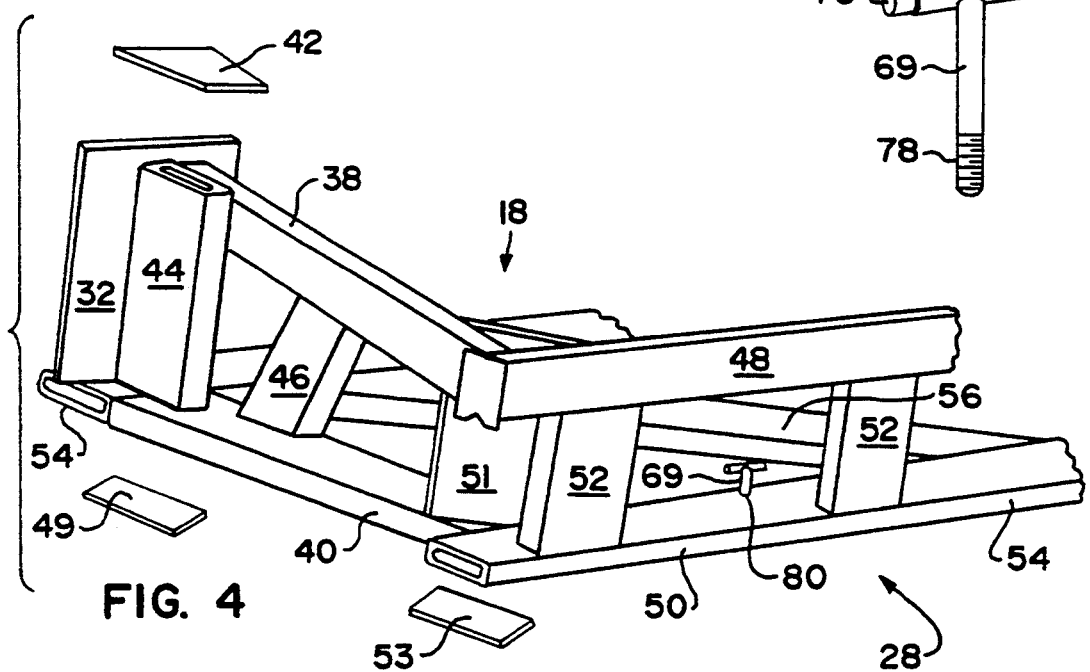

VEHICLE FUEL TANK MOUNTING AND PROTECTIVE CAGE

BACKGROUND OF THE INVENTION

The present invention relates generally to a fuel tank mounting and protecting cage for use with vehicles such as school buses.

The prior art protective cage and mounting device for vehicle gas tanks has proven successful in protecting the fuel tank against rupture in the event of an accident. FIG. 1 illustrates the prior art protective cage and fuel tank mounting mechanism, that were used on vehicles of the assignee of this patent. The protective cage is constructed from round tubing made of high carbon steel. The fuel tank has not been shown in FIG. 1 to better illustrate the fuel tank mounting mechanism and the protective cage. In this prior art device, the fuel tank is anchored to the longitudinal side of a vehicle frame rails, through the mounting mechanism. The fuel tank mounting mechanism includes a plurality of hanger brackets that are secured along their vertical legs to the vehicle frame rails. The fuel tank is supported on a shelf formed by the horizontal legs of the hanger brackets. Hold down devices secure the fuel tank to the hanger brackets. A heat shield is shown secured to the bottoms of the fuel tank hanger brackets.

The protective cage is also secured to the vehicle frame rail, and surrounds the three exposed sides of the fuel tank. The closed ends of the fuel tank add rigidity to the end sections of the fuel tank; however, the mid-section of a fuel tank may be less rigid and therefore may be more vulnerable. An elongated angle member is connected to the protective cage and to the hanger brackets. However, this angle member is connected to the round tubing of the protective cage through hanger brackets which may not function to unite the protective cage and the fuel tank mounting mechanism such that they function as a unit in the event of a crash.

It has been asserted that, under some situations, a fuel tank that is mounted and protected by the above prior art mechanism could be ruptured. Although the prior art protective cage does provide protection for the mid-section of the fuel tank, because of the possible vulnerability of this section of the fuel tank compared to the end sections and the possibility that the protective cage could be bent into engagement with the fuel tank mid-section, additional protection will be provided for this area of the fuel tank. It is felt that the midsection of a fuel tank may be vulnerable, especially in the event of a side collision that is concentrated around the mid-portion of the protective cage. In such a collision, the prior art protective cage could collapse in on the fuel tank rather than transfer the impact force through the protective cage to the vehicle frame rails.

Within the space constraints imposed by the wall of the fuel tank and the inside surface of the side skirting of the vehicle, a circular cross-section is not the most efficient cross-section. Instead, a beam of rectangular cross-section can be better used to resist an externally imposed force. Also the high carbon steel from which the prior art protective cage was fabricated can be distorted by a relatively smaller force and thus absorbs a correspondingly smaller amount of impact force.

SUMMARY OF THE INVENTION

The advantages provided by this invention are that the fuel tank is now mounted solely on the protective cage which greatly reduces relative movement between the protective cage and the fuel tank in the event of an accident. The protective cage serves the dual function of supporting the fuel tank and providing protection for the tank. This reduces the number of required fuel system parts and facilitates assembly. Also, the protective cage of this invention, as a result of its construction and the material from which it is fabricated, absorbs more impact energy in the event of an accident and will transfer the forces from a side impact to the vehicle frame rails rather than collapsing against the fuel tank mid-portion. More specifically, the lower shelf is actually a collection of beams welded together to form a truss which is very strong in its resistance to lateral impact forcesas well as providing good resistance to parallelogramming of the cage.

According to this invention, a protective cage and mounting device is provided for vehicles such as school buses having longitudinally extending frame rails that provide outwardly facing vertical surfaces to which the protective cage and mounting device is mounted. The protective cage and mounting device of this invention includes front, rear, side and bottom shelf sections, each of these sections being weldments constructed of low carbon, high strength steel tubing having rectangular cross-sections. The sections are welded to each other to produce stiff joints between said sections with the result that there is less rotation and localized deformation of the protection cage in the event of an accident. Hold down devices are carried by the protection cage for securing a fuel tank directly and solely to the protection cage,

BRIEF DESCRIPTION OF TEE DRAWINGS

FIG. 3 is a perspective view of the mounting and protective cage, with a fuel tank secured in place, mounted on a the vertical surface of a vehicle frame rail.

FIG. 4 is a perspective sketch of one end of the mounting and protective cage, in a larger scale than seen in FIG. 3, with the fuel tank removed.

FIG. 5 is a perspective view, of the bottom surface, of an end portion of a hold down member with a t-bold in the loop.

DETAILED DESCRIPTION OF TEE PREFERRED EMBODIMENT

Figure 1:
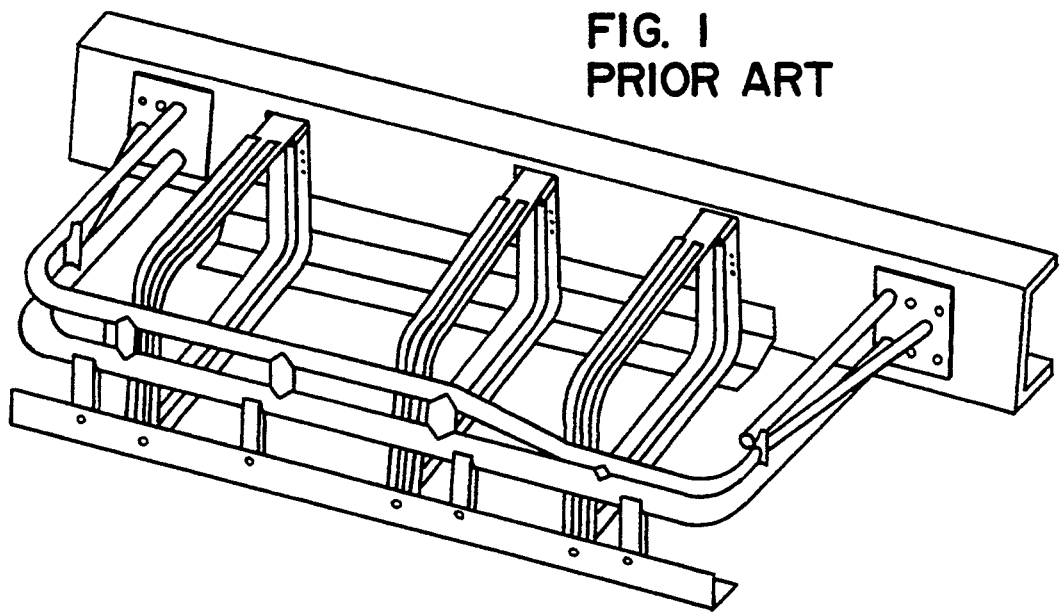
FIG. 1 is a perspective view of a prior art fuel tank mounting mechanism and protective cage.
Figure 2:
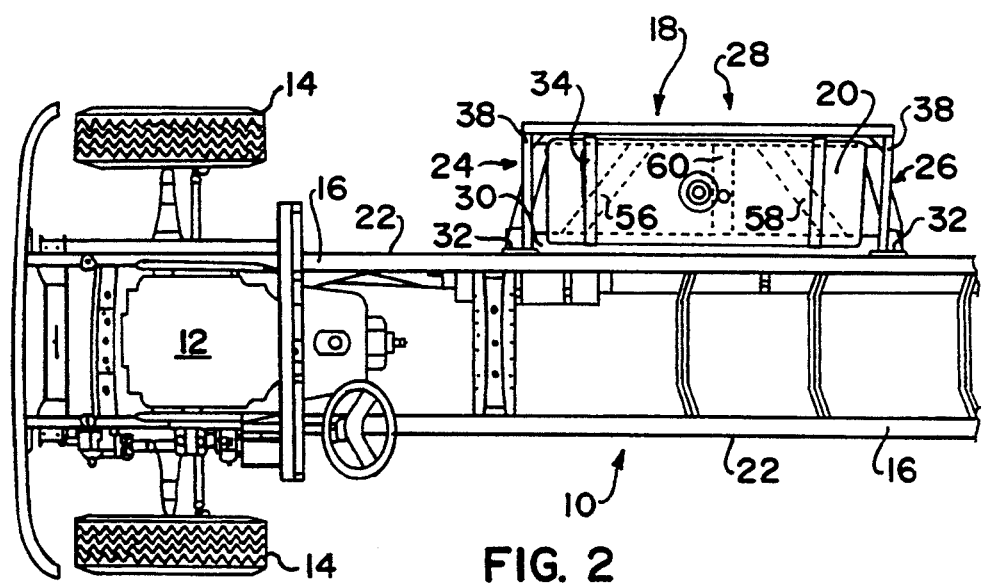
FIG. 2 is a plan view of a portion of a vehicle chassis with the fuel tank mounting cage and fuel tank of this invention mounted thereon.

Referring now to FIG. 2, a plan view of a portion of a vehicle chassis 10 illustrates longitudinally extending frame rails 16 to which a mounting and protective cage 18 is secured. The mounting and protective cage 18 is secured by nuts and bolts extending through mounting plates 32 to a vertical surface 22 of a frame rail 16. A fuel tank 20 is secured, by hold down devices 34 to the mounting and protective cage 18.

The frame rails 16 of the vehicle are formed from U-shaped channels having the vertical surface 22 of the web facing outwardly. The frame rails 16 extend the entire length of the vehicle chassis 10 and function as the frame to which all other major components such as an engine 12 and front steerable wheels 14 are mounted. The chassis 10 of course also includes rear wheels (not shown) that are carried by the frame rails 16. In FIG. 2 the fuel tank is shown mounted on the right hand (looking toward the front of the vehicle) longitudinal frame rail 16; however, it should be understood that the fuel tank could be mounted on the left longitudinal frame rail 16 or a fuel tank could be mounted on each of the frame rails 16.

The mounting and protective cage 18 is fabricated from four sections, a front 24, a back 26, a side 28 and a bottom shelf 30 which are each weldments constructed mainly from low carbon, high strength steel tubing having a rectangular cross section. The front 24, back 26, side 28 and bottom shelf 30 are all welded together to form a very strong, stiff and stable fuel tank mount and protective cage. The welded construction of the front 24, back 26, side 28 and bottom shelf 30 and the welding of these individual sections into an integrated assembly provides for stiff joints with the result that there will be less rotation and localized deformation in the event of an accident.

The mounting and protective cage 18 is secured by nuts and bolts to the vertical surface 22 of the frame rails 16. The fuel tank 20 is secured to the mounting and protective cage 18 and is thus not directly connected to the frame rails 16. This construction minimizes the relative motion between the fuel tank 20 and the mounting and protective cage 18 which results in less fuel tank 20 deformation in the event of an accident. Hold down members 34 secure the fuel tank 20 to the mounting and protective cage 18 rather than to the frame rails 16 which results in the mounting and protective cage 18 and the fuel tank 20 becoming an integral unit rather than separate units between which there can be relative motion as in the prior art device.

FIG. 3 discloses a fuel tank 20 secured in place, in the nest formed in the mounting and protective cage 18, by the hold down members 34. The mounting and protective cage 18 is shown mounted to a vertical surface 22 of a frame rail 16.

Since the front 24 and the back 26 of the mounting and protective cage 18 are structurally identical, the following description of the front 24 will apply equally to the back 26. An upper tube 38 extends downwardly, from an inner end of said front section adjacent to the frame rails 16, to an outer end of said front section adjacent to the side 28. However, as seen in the plan view (FIG. 2) it is perpendicular to the vertical surface 22 of the frame rails 16. The long axis of rectangular shaped upper tube 38 extends vertically and thus upper tube 38 will provide greater protection to the front section 24 against attempts to bend it upwardly then to bend it toward the side. A lower tube 40 extends substantially parallel to the ground and rearwardly, from its end adjacent to the frame rails 16, toward its end that is connected to the side 28. The long axis of rectangular shaped lower tube 40 extends horizontally and thus lower tube will provide greater protection to the front section 24 against attempts to bend the protective cage in the forward or rearward directions. A vertically extending tube 44 connects the ends of upper tube 38 and lower tube 40. A second diagonally extending tube 46 connects the mid portions of upper tube 38 and lower tube 40. The diagonally extending tube 46 extends at a slight angle to the vertical and is also referred to a vertically extending tube. The upper tube 38, lower tube 40, vertically extending tube 44 and diagonally extending tube 46 are connected to each other by welding which provides a very strong and rigid connection between these parts of the front 24.

It should be noted that since the front 24, back 26, side 28 and 30 will all be connected together, some of the junctions of these parts, for example, the junction of the bottom end of vertically extending tube 44 and the end of lower tube 40 adjacent to the frame rails 16, are arranged to receive interlocking elements from other parts of the protective cage at the junction. At this particular juncture, the end of one side tube 54 of the bottom shelf 30 is interlocked with the front 24. As a result of this arrangement, there are more aligned edges of the two parts that can be connected by welding. This interlocking joint between the front 24 and the bottom shelf 30 is a much stronger and rigid connection than would have been obtained had the members been butt welded together. Also, a structural support plate 49 is welded across the bottoms of the lower tube 40 and the parallel side tubes 54 that bridges the connecting edges of these tubes to thereby provide extra strength to this juncture.

The side 28 includes an upper tube 48 and a parallel lower tube 50 that are connected by a plurality of vertical tubes 52. As in the previously discussed connections between the tubes forming the front 24 and back 26, the tubes forming side 28 are welded together. The front and rear ends of the side 28 are connected by weld to the free ends of the front 24 and back 26. Vertically extending corner plates 51 extend across the inner surfaces of the front 24 and side 28 to produce a rigid triangular connection at these corners. Also there is a structural support plate 53 (see FIG. 4) secured by welding to the bottom surfaces of lower tube 40 and lower tube 50 which adds strength and rigidity to this juncture. It should be noted that the connection of the front end of side 28 to the front 24 is identical to the connection of the rear end of the side 28 to the back 26, thus only one of these junctures has been described in detail.

The bottom shelf 30 is comprised of a pair of parallel side tubes 54 that lie in a horizontal plane. The pair of parallel side tubes 54 are interconnected by a front diagonal tube 56, a rear diagonal tube 58 and perpendicular tube 60 thus forming a horizontal truss structure. Rectangular tubes 54, 56, 58 and 60 are all arranged with their long axes horizontal which results in the bottom shelf 30 being very strong in resisting deformation toward the front or rear of the vehicle. The truss structure of the bottom shelf 30 will withstand a considerable force applied toward the front or back at the corner of the protective shield before it will deform by parallelogramming. The front diagonal tube 56, rear diagonal tube 58 and perpendicular support tube 60 are shown seen as broken lines in FIG. 2. The ends of front diagonal tube 56, rear diagonal support tube 58 and support tube 60 are welded to the longitudinally extending vertical edges of the parallel side tubes 54. It should be noted that the parallel side tube 54 of bottom shelf 30 and lower tube 50 of side 28 are the same element. This single element forms a component of both the side 28 and the bottom shelf 30.

As can be best seen in FIG. 5, the hold down members 34 are formed from steel straps that are folded over to form loops 70 at each end. In the embodiment disclosed, two hold down members 34 are utilized; however, additional hold down members 34 could be applied if deemed necessary. A hole 72 is formed in the bottom of each loop through which the upright portion of a t-bolt 69 extends. The cross-section 76 of each t-bolt 69 is thus cradled in the loop 70 of the hold down member 34. The free ends 78 of the t-bolts 69 are threaded and extend through holes 80 formed in the parallel side tubes 54. Lock nuts are threaded on the free ends of the t-bolts 69 and bear against the bottom surface of the parallel side tubes 54. A vinyl lining 82 is applied to the under surface of the hold down members 34 to protect the fuel tank 20. The lock nuts can be tightened until sufficient torque has been applied by the hold down members 34 on the fuel tank 20 to securely fasten the fuel tank 20 to the mounting and protective cage 18.

The mounting plates 32 are secured by welding to an upright surface of vertically extending tube 44, the ends of upper tubes 38 that are adjacent the frame rails 16 and the top surface of parallel side tubes 54 that is adjacent to the frame rails 16. It is important that the mounting plates 32 be securely connected to the mounting and protective cage 18 because they are the sole connecting support for the mounting and protecting cage to the vehicle. The mounting plates 32 have six holes formed therethrough, and there are corresponding holes formed in the vertical surface 22 of the frame rails 16. Bolts 33 are inserted through these aligned holes and torqued down to provide a rigid connection between the mounting and protective cage 18 and the vehicle frame rails 16.

During initial assembly of the vehicle and during servicing of the fuel tank 20, the mounting and protective cage 18 with the fuel tank 20 securely fastened thereto is handled as a modular unit rather than as individual parts. This has the advantageous result of a simpler assembly process and reduces the possibility of errors in servicing the fuel tank. The only other connections between the modular unit and the vehicle are the fuel lines that extend from the fuel tank 20 to the engine 12.

FIG. 4 illustrates one end of the mounting and protective cage 18 in a larger scale with the fuel tank 20 removed to better show the bottom shelf 30 and one of the t-bolts 69. In FIG. 4 the cover plate 42 that covers and prevents water from entering the upper end of vertically extending tube 44 and the structural support plates 49 and 53 that are secured to the bottom surface of the mounting and protective cage 18 are shown. These plates 49 and 53 are shown exploded away from the area of the mounting and protective cage 18 to which they are connected by welding to better show their shapes. The vertical support plate 51 that connects the attached ends of the front 24 and the side 28 is clearly illustrated in this view. Also in FIG. 4 one of the t-bolts 69 is shown extending upwardly through a hole 80 formed in parallel side tube 54 of the bottom shelf 30. The front diagonal tube 56 of the bottom shelf 30 can also be clearly seen in FIG. 4.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. For use with a vehicle of the type having a fuel tank and a longitudinally extending frame rail a web section of which extends vertically to provide a outwardly facing vertical surface, a fuel tank mounting and protection cage adapted to be secured to the outwardly facing vertical surface of the frame rail comprising:
a front section having inner and outer ends,
a rear section having inner and outer ends,
a side section having front and rear ends, and
a shelf section,
said front and rear sections, side section and shelf section being weldments constructed of low carbon, high strength steel tubing having rectangular cross-sections,
said front and rear sections, side section and shelf section being welded to each other to produce stiff joints between each of said sections and less rotation and localized deformation of the protection cage in the event of an accident; and
hold down devices carried by the protection cage for securing said fuel tank solely to the protection cage and independently of said frame rail.

2. The invention as set forth in claim 1 wherein mounting plates are secured to the inner ends of said front and rear sections, and securing means for removably securing said mounting plates to said outwardly facing vertical surface of the longitudinally extending frame rail.

3. The invention as set forth in claim 1 wherein said front section, rear section, side section and shelf section are each impact resisting sub-assemblies made from tubing having a cross section of sufficient strength to resist material bending to the extent that, if the vehicle is engaged in an accident in which an input force is directed against the protection cage, such impact force will be absorbed by these sub-assemblies and transferred to the vehicle frame rail through said mounting plates, 4. The invention as set forth in claim 3 wherein the outer ends of the front and rear sections are connected by welding to the front and rear ends, respectively, of the side section such that the side section is substantially parallel to the frame rail.

5. The invention as set forth in claim 1, wherein said hold down devices are carried by the shelf-section of the protective cage.

6. The invention as set forth in claim 5 wherein said front section, rear section, side section and shelf section are each impact resisting sub assemblies made from tubing having a cross section of sufficient strength to resist material bending to the extent that, if the vehicle is engaged in an accident in which an input force is directed against the protection cage, such impact force will be absorbed by these sub-assemblies and transferred to the vehicle frame rail through said mounting plates.

7. The invention as set forth in claim 6 wherein the outer ends of the front and rear sections are connected by welding to the front and rear ends, respectively, of the side section such that the side section is substantially parallel to the frame rails.

8. The invention as set forth in claim 1, wherein said front, rear and side sections are each fabricated from vertically spaced upper and lower tubes interconnected by vertically extending tubes.

9. The invention as set forth in claim 8 wherein said front and rear sections include a diagonally extending tube.

10. The invention as set forth in claim 1 wherein said shelf section includes a pair of parallel side tubes that are connected to the front and rear sections and to at least one diagonal tube connecting said pair of parallel side tubes.

11. The invention as set forth in claim 10, wherein said front, rear and side sections are each fabricated from vertically spaced upper and lower tubes interconnected by vertically extending tubes.

12. The invention as set forth in claim 11 wherein said front and rear sections include a diagonally extending tube.

13. The invention as set forth in claim 11, wherein said hold down devices extend from one of said pair of parallel side tubes to the other of said pair of parallel side tubes.

14. The invention as set forth in claim 13, wherein mounting plates are secured to the inner ends of said front and rear sections and the upper tubes are secured to the mounting plates and said lower tubes of said front and rear sections, are secured to said mounting plates forwardly and rearwardly respectively of the securement of the upper tubes to the mounting plates, thus providing greater stability to the front and rear sections.

15. For use with a vehicle of the type having a fuel tank and a longitudinally extending frame rail having a web section of which extends vertically to provide a outwardly facing vertical surface, a fuel tank protective cage adapted to be secured to the outwardly facing vertical surface of the frame rail comprising:
  a front section having inner and outer ends,
  a rear section having inner and outer ends,
  a side section having front and rear ends, and
  a shelf section, said shelf section comprising a truss structure including a pair of horizontally extending parallel side tubes, a front diagonal tube extending between and secured to said parallel side tubes adjacent to said front section, and a rear diagonal tube extending between and secured to said parallel side tubes adjacent to said rear section, said front and rear sections, side section and shelf section being welded to each other.

16. The fuel tank protective cage of claim 15 wherein said diagonal tubes are not parallel.

17. A vehicle comprising:
  a mobile frame including a pair longitudinally extending frame rails, one which having a web section extending vertically to provide an outwardly facing vertical surface;
  a fuel tank mounting and protective cage secured to the outwardly facing vertical surface of the frame rail, said fuel tank mounting and protection cage including a front-section having inner and outer extremities, a rear section having inner and outer extremities,
  a side section having front and rear extremities, and a shelf section, said front and rear sections, side section and shelf section being weldments constructed of low carbon, high strength steel tubing having rectangular cross-sections, said front and rear sections, side section and shelf section being welded to each other to produce stiff joints between said sections and less rotation and localized deformation of the protection cage in the event of an accident, said shelf section being fabricated of a pair of longitudinally extending parallel side tubes, and at least one diagonal tube extending between and secured to said parallel side tubes; and
  a fuel tank mounted to said fuel tank mounting and protective cage. protection cage.

18. The invention as set forth in claim 17 in which said shelf section includes a front diagonal tube extending between and secured to said parallel side tubes adjacent to said front section and a rear diagonal tube extending between and secured to said parallel side tubes adjacent to said rear section.

19. The invention as set forth in claim 18 in which said shelf-section includes a support tube that is perpendicular to, extending between and secured to said parallel side tubes.

20. The invention as set forth in claim 19 in which the tubes of said shelf section have long axes and short axes and have their long axes arranged horizontally.

21. The invention as set forth in claim 17 and means associated with said bottom shelf portion for securing said said fuel tank thereto.

22. The invention as set forth in claim 21 and said fuel tank being secured solely to said shelf portion.

23. A vehicle comprising:
  a mobile frame including a pair longitudinally extending frame rails, one of which having a web section extending vertically to provide an outwardly facing vertical surface;
  a fuel tank mounting and protective cage secured to the outwardly facing vertical surface of the frame rail, said fuel tank mounting and protection cage comprising a plurality of tubes welded together to define, with said frame rail, defining an enclosure; and
  a fuel tank mounted to said fuel tank mounting and protection cage within said enclosure independently of said frame rail.

* * * * *